(12) United States Patent
Yang et al.

(10) Patent No.: US 12,063,086 B2
(45) Date of Patent: Aug. 13, 2024

(54) UPLINK BEAM TRAINING METHOD, TERMINAL DEVICE, AND NETWORK SIDE DEVICE

(71) Applicant: VIVO MOBILE COMMUNICATION CO., LTD., Guangdong (CN)

(72) Inventors: Yu Yang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 672 days.

(21) Appl. No.: 17/320,278

(22) Filed: May 14, 2021

(65) Prior Publication Data
US 2021/0273702 A1     Sep. 2, 2021

Related U.S. Application Data

(63) Continuation of application No. PCT/CN2019/116585, filed on Nov. 8, 2019.

(30) Foreign Application Priority Data

Nov. 16, 2018   (CN) .......................... 201811368876.6

(51) Int. Cl.
| | |
|---|---|
| *H04B 7/06* | (2006.01) |
| *H04B 7/0404* | (2017.01) |
| *H04B 7/0413* | (2017.01) |
| *H04L 5/00* | (2006.01) |

(52) U.S. Cl.
CPC ......... *H04B 7/0617* (2013.01); *H04B 7/0404* (2013.01); *H04L 5/0048* (2013.01); *H04B 7/0413* (2013.01)

(58) Field of Classification Search
CPC .. H04B 7/0404; H04B 7/0413; H04B 7/0617; H04B 7/0691; H04L 5/0048
See application file for complete search history.

(56) References Cited

U.S. PATENT DOCUMENTS

| | | | |
|---|---|---|---|
| 11,496,204 B2* | 11/2022 | Guan | ................... H04L 5/0091 |
| 2013/0258972 A1 | 10/2013 | Kim et al. | |
| 2018/0199212 A1 | 7/2018 | Lin et al. | |
| 2018/0206132 A1 | 7/2018 | Guo et al. | |
| 2018/0309488 A1 | 10/2018 | Huang et al. | |

(Continued)

FOREIGN PATENT DOCUMENTS

| | | |
|---|---|---|
| CN | 106936487 A | 7/2017 |
| CN | 107733479 A | 2/2018 |

(Continued)

OTHER PUBLICATIONS

Supplementary European Search Report regarding Patent Application No. 19883427.7-1216/3883138; PCT/CN2019/116585, dated Nov. 26, 2021.

(Continued)

*Primary Examiner* — Robert C Scheibel
(74) *Attorney, Agent, or Firm* — Harness, Dickey & Pierce, P.L.C.

(57) ABSTRACT

An uplink beam training method includes: determining a target antenna set in a plurality of supported antenna sets based on first network signaling; determining an uplink beam training mode of the target antenna set; and performing beam training based on the uplink beam training mode.

15 Claims, 3 Drawing Sheets

Determine a target antenna set in a plurality of supported antenna sets based on first network signaling — S101

Determine an uplink beam training mode of the target antenna set — S103

Perform beam training based on the uplink beam training mode — S105

(56) References Cited

U.S. PATENT DOCUMENTS

| | | | |
|---|---|---|---|
| 2019/0068263 A1* | 2/2019 | Yu | H04B 7/088 |
| 2021/0091834 A1* | 3/2021 | Wu | H04B 7/0628 |
| 2021/0153215 A1* | 5/2021 | Guan | H04L 67/303 |
| 2021/0250152 A1* | 8/2021 | Zhang | H04B 7/0695 |
| 2021/0336737 A1* | 10/2021 | Li | H04L 5/0094 |

FOREIGN PATENT DOCUMENTS

| | | |
|---|---|---|
| CN | 107733484 A | 2/2018 |
| CN | 108023618 A | 5/2018 |
| WO | WO-2018028690 A1 | 2/2018 |

OTHER PUBLICATIONS

"Enhancements on multi-beam operation," CATT, 3GPP TSG RAN WG1 Meeting #95, R1-1812636, dated Nov. 16, 2018.

"Panel-based UL beam selection," Huawei, HiSilicon, 3GPP TSG RAN WG1 Meeting #94bis, R1-1810107, dated Oct. 12, 2018.

"Feature lead summary 1 on beam measurement and reporting," Ericsson, 3GPP TSG RAN WG1 Meeting #92, R1-1803260, dated Mar. 2, 2018.

First Office Action regarding Korean Patent Application No. 10-2021-7017067, dated Jul. 14, 2022. Translation provided by Bohui Intellectual Property.

"Feature lead summary of Enhancements on Multi-beam Operations," LG Electronics, 3GPP TSG RAN WG1 Meeting #95, R1-1813944, dated Nov. 16, 2018.

"Remaining details on beam management," CATT, 3GPP TSG RAN WG1 Meeting #92, R1-1801721, dated Mar. 2, 2018.

"Details of UL beam management," ZTE, Sanechips, 3GPP TSG RAN WG1 Meeting 91, R1-1719539, dated Dec. 1, 2017.

International Search Report and Written Opinion of the International Searching Authority regarding International Patent Application No. PCT/CN2019/116585, dated Feb. 7, 2020. Translation provided by Bohui Intellectual Property.

"Enhancement on Multi-Beam Operation," Huawei; HiSilicon, 3GPP TSG RAN WG1 Meeting #94bis, R1-1811470, dated Oct. 12, 2018.

First Office Action regarding Chinese Patent Application No. 201811368876.6, dated Jan. 12, 2021. Translation provided by Bohui Intellectual Property.

"Beam management procedure and beam reporting for NR," Vivo, 3GPP TSG RAN WG1 Meeting #88, R1-1703388, dated Feb. 17, 2017.

"Discussion on beam training," CATT, 3GPP TSG RAN Meeting #86, R1-166480, dated Aug. 26, 2016.

* cited by examiner

UPLINK BEAM TRAINING METHOD, TERMINAL DEVICE, AND NETWORK SIDE DEVICE

CROSS-REFERENCE TO RELATED APPLICATIONS

This application is a Bypass Continuation Application of PCT/CN2019/116585, filed on Nov. 8, 2019, which claims priority to Chinese Patent Application No. 201811368876.6, filed on Nov. 16, 2018 in China, which are incorporated herein by reference in their entirety.

TECHNICAL FIELD

The present disclosure relates to the communications field, and in particular, to an uplink beam training method, a terminal device, and a network side device.

BACKGROUND

As a demand for a data amount of a terminal device increases, in order to meet an increasing demand for communication performance, combination of massive antennas and high-frequency communication will become a trend, where a high frequency band is a frequency band above 6 GHz.

SUMMARY

Embodiments of the present disclosure aim to provide an uplink beam training method, a terminal device, and a network side device.

According to a first aspect, some embodiments of the present disclosure provide an uplink beam training method. The method is applied to a terminal device and includes:
  determining a target antenna set in a plurality of supported antenna sets based on first network signaling;
  determining an uplink beam training mode of the target antenna set; and
  performing beam training based on the uplink beam training mode.

According to a second aspect, some embodiments of the present disclosure provide an uplink beam training method. The method is applied to a network side device and includes:
  generating first network signaling; and
  transmitting the first network signaling, where the first network signaling is used to indicate a target antenna set in a plurality of antenna sets supported by a terminal device, so that the terminal device performs beam training based on an uplink beam training mode of the target antenna set.

According to a third aspect, some embodiments of the present disclosure provide a terminal device. The terminal device includes:
  a first determining module, configured to determine a target antenna set in a plurality of supported antenna sets based on first network signaling;
  a second determining module, configured to determine an uplink beam training mode of the target antenna set; and
  a training module, configured to perform beam training based on the uplink beam training mode.

According to a fourth aspect, some embodiments of the present disclosure provide a network side device. The network side device includes:
  a generation module, configured to generate first network signaling; and
  a transmitting module, configured to transmit the first network signaling, where the first network signaling is used to indicate a target antenna set in a plurality of antenna sets supported by a terminal device.

According to a fifth aspect, some embodiments of the present disclosure provide a terminal device, including a memory, a processor, and a program that is stored in the memory and that can run on the processor, where when the processor executes the program, steps of the method in the first aspect are implemented.

According to a sixth aspect, some embodiments of the present disclosure provide a network side device, including a memory, a processor, and a program that is stored in the memory and that can run on the processor, where when the processor executes the program, steps of the method in the second aspect are implemented.

According to a seventh aspect, some embodiments of the present disclosure provide a non-transitory computer-readable storage medium. The non-transitory computer-readable storage medium stores a computer program, and when a processor executes the computer program, steps of the method in the first aspect or steps of the method in the second aspect are implemented.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

A corresponding multiple-input multiple-output (MIMO) technology is introduced in mobile communications systems such as long term evolution (LTE), long term evolution advanced (LTE-A), and fifth-generation (5G), to utilize spatial freedom obtained by a multi-antenna system based on the MIMO technology, thereby improving a peak rate and system spectrum utilization.

With continuous expansion of dimensions of the MIMO technology, use of massive antenna arrays can greatly improve system frequency band utilization and support access of a larger quantity of users, for example, a massive MIMO technology. Moreover, with continuous development of a next-generation communications system after fourth-generation (4G), a working frequency band supported by the communications system is increased to a high frequency band above 6 GHz, such as 100 GHz. The high frequency band has relatively abundant idle frequency resources, so that a greater throughput can be provided for data transmission. In addition, a signal on the high frequency band has a short wavelength. Therefore, in comparison with a low frequency band, more antenna elements can be arranged on an antenna set with a same size, so that a beamforming technology can be used to form a beam with stronger directivity and a narrower lobe. It can be learned that as a demand for a data amount of a terminal device increases, in order to meet an increasing demand for communication performance, combination of massive antennas and high-frequency communication will become a trend.

In consideration of a high path loss of a high frequency band, in order to obtain a maximum antenna gain, it is necessary to perform beam training between a network device and a terminal device, that is, to find an optimal transmit and receive beam pair link through beam sweeping, so as to implement normal communication between the network device and the terminal device. To implement beam sweeping and alignment, beam training needs to be performed. However, for scenarios with high-density users of the high frequency band, especially when the terminal device has a plurality of antenna sets, overheads of beam training are relatively large.

Therefore, there is an urgent need for an uplink beam training scheme to reduce overheads of uplink beam training.

The following describes the technical solutions in various embodiments of the present disclosure in detail with reference to the accompanying drawings.

Figure 1:
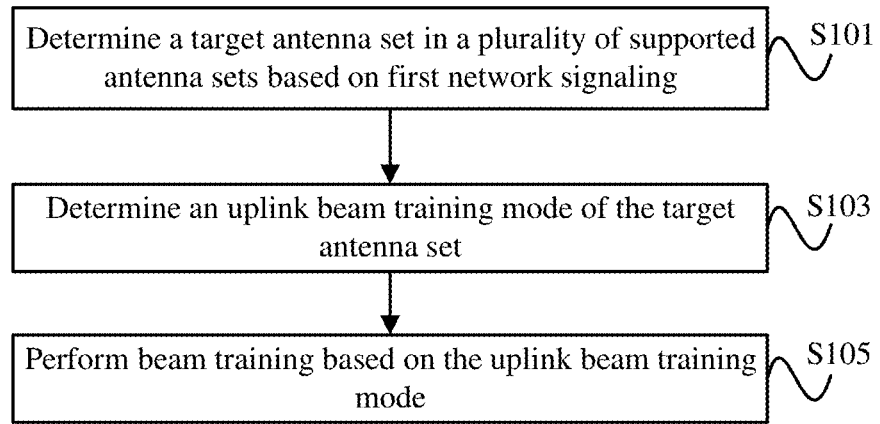
FIG. 1 is a schematic flowchart of an uplink beam training method applied to a terminal device according to some embodiments of the present disclosure.

As shown in FIG. 1, some embodiments of the present disclosure provide an uplink beam training method. The method is applied to a terminal device and includes the following steps:

S101: Determine a target antenna set in a plurality of supported antenna sets based on first network signaling.

It can be understood that the terminal device in some embodiments of the present disclosure supports the plurality of antenna sets, where the antenna set may be referred to as an antenna panel, or may be referred to as an antenna port set, an antenna group, an antenna port group, or the like.

In this embodiment, the first network signaling may include at least one of downlink control information (DCI) signaling at a physical layer, media access control-control element (MAC CE) signaling at a media access control layer, or radio resource control (RRC) signaling at a radio resource control layer.

In some embodiments of the present disclosure, a scheme of determining the target antenna set in the plurality of antenna sets based on the first network signaling may be implemented in the following several different manners, to provide a favorable guarantee for implementing the uplink beam training method in some embodiments of the present disclosure.

Manner 1 of Determining the Target Antenna Set

In this embodiment, the determining, based on first network signaling, a target antenna set in a plurality of supported antenna sets may include:

obtaining antenna set related information in the first network signaling; and determining the target antenna set based on the antenna set related information.

Optionally, by setting the antenna set related information for specifying the target antenna set in the first network signaling, the target antenna set is accurately located among the multiple antenna sets supported by the terminal device.

The antenna set related information may include one piece of the following information:

antenna set identifier information, such as an antenna set name or an antenna set number, so that the identifier information can be used to directly and accurately locate the target antenna set;

reference signal (RS) resource information, where there is an association relationship between the RS resource information and an antenna set; and RS resource set information, where there is an association relationship between the RS resource set information and an antenna set.

It can be understood that, to implement uplink beam training, the network side device needs to configure at least one RS resource set for the terminal device and configure at least one RS resource in each RS resource set. In this case, the association relationship between the antenna set and the RS resource information or the association relationship between the antenna set and the RS resource set information may be established, to accurately locate the target antenna set in the plurality of antenna sets supported by the terminal device.

Optionally, the network side may configure the RS resource set for the terminal device and configure the RS resource for the RS resource set by using RRC signaling.

Optionally, the association relationship between the RS resource information and the antenna set may be displayed in a manner of indicating the antenna set by using an RS resource index, and the association relationship between the RS resource set information and the antenna set may be displayed in a manner of indicating the antenna set by using an RS resource set index.

Optionally, in a case that the antenna set related information is the RS resource set information, the scheme of determining the target antenna set based on the antenna set related information may be implemented by performing the following steps:

indicating the target RS resource set based on the RS resource set information; and determining, based on the association relationship between the RS resource set information and the antenna set, the target antenna set corresponding to the target RS resource set.

It can be understood that, in this embodiment, the target RS resource set may be indicated based on the first network signaling, and then the target antenna set may be determined based on the association relationship between the RS resource set information and the antenna set.

Optionally, the first network signaling used to indicate the target RS resource set may include MAC CE signaling or DCI signaling.

Manner 2 of Determining the Target Antenna Set

In this embodiment, the determining, based on first network signaling, a target antenna set in a plurality of supported antenna sets may include:

triggering a target RS resource set based on the first network signaling; and determining, based on an association relationship between an RS resource set and an antenna set, the target antenna set corresponding to the target RS resource set.

It can be understood that, in this embodiment, the target RS resource set may be triggered based on the first network signaling, and then the target antenna set is determined based on the association relationship between the RS resource set information and the antenna set.

Optionally, the first network signaling used to trigger the target RS resource set may include DCI signaling.

Optionally, the association relationship between the RS resource set and the antenna set may be placed in first configuration information, and the first configuration information is information set by a network device for the target RS resource set based on capability parameter information of the terminal device.

Optionally, first configuration information may be placed in the first network signaling, and the scheme of determining, based on the association relationship between the RS resource set and the antenna set, the target antenna set corresponding to the target RS resource set may include:

obtaining the first configuration information, where the first configuration information is information configured by a network device for the target RS resource set based on capability parameter information of the terminal device; and determining the target antenna set based on the association relationship included in the first configuration information.

Optionally, the association relationship between the RS resource set information and the antenna set may be displayed in a manner of indicating the antenna set by using an RS resource set index.

Optionally, the capability parameter information of the terminal device may include: information about a maximum quantity of antenna sets supported by the terminal device and information about a maximum quantity of supported beams in each antenna set.

It can be understood that a maximum quantity of RS resource sets configured for the terminal device may be determined based on the information about the maximum quantity of antenna sets supported by the terminal device, and a maximum quantity of RS resources configured for an RS resource set corresponding to an antenna set may be determined based on the information about the maximum quantity of supported beams in each antenna set.

The target antenna set for uplink beam training is determined in one of the above manners, so that overheads and a delay of uplink beam training can be reduced. Further, to successfully implement the uplink beam training scheme, the following step needs to be performed:

S103: Determine an uplink beam training mode of the target antenna set.

It can be understood that after determining an antenna set for uplink beam training based on the first network signaling, to further reduce overheads and a delay of uplink beam training, corresponding uplink beam training modes may be matched for different specific scenarios.

Optionally, in a case that the target RS resource set includes a target sounding reference signal (SRS) resource set, the uplink beam training mode may be determined by using one of the following embodiments:

Embodiment 1 of Determining the Uplink Beam Training Mode

In this embodiment, step S103 may include:

determining whether first spatial relation information is configured for the target SRS resource set; and determining the uplink beam training mode based on a first result.

It can be understood that a beam required for uplink beam training on the target SRS resource set may be indicated based on the first spatial relation information corresponding to the target SRS resource set, that is, a source RS corresponding to the target SRS resource set is indicated based on the first spatial relation information, and an uplink transmit beam used by the source RS is used for uplink beam training based on the target SRS resource set. In this way, whether the first spatial relation information is configured for the target SRS resource set affects determining of the uplink beam training mode, and different uplink beam training modes may be adapted based on different results. Optionally, the following several cases are included:

(1) In a case that the first result is that the first spatial relation information is configured for the target SRS resource set, it is determined that the uplink beam training mode includes: transmitting information on all SRS resources in the target SRS resource set on a target uplink transmit beam corresponding to a source RS, where the source RS corresponds to the first spatial relation information.

It can be understood that when the first spatial relation information corresponding to the source RS is configured for the target SRS resource set, uplink beam training may be performed by transmitting the information on all the SRS resources in the target SRS resource set on the fixed target uplink transmit beam.

(2) In a case that the first result is that the first spatial relation information is configured for the target SRS resource set, it is determined that the uplink beam training mode includes: transmitting, through beam sweeping based on a first spatial range and the first spatial relation information, information on all SRS resources included in the target SRS resource set.

It can be understood that when the first spatial relation information corresponding to the source RS is configured for the target SRS resource set, the information on all the SRS resources in the target SRS resource set may be sent through beam sweeping, that is, beam sweeping is performed within the first spatial range around a target uplink transmit beam corresponding to the first spatial relation information, to implement uplink beam training.

Optionally, the first spatial range may be determined by the terminal device, or the spatial range may be configured based on network signaling, where the spatial range may include angle range information, and the network signaling used for configuring the first spatial range may include RRC signaling or MAC CE signaling or DCI signaling.

(3) In a case that the first result is that the first spatial relation information is configured for the target SRS resource set, it is determined that the uplink beam training mode includes: determining the uplink beam training mode based on second network signaling.

Optionally, the second network signaling includes RRC signaling or MAC CE signaling or DCI signaling.

It can be understood that when the first spatial relation information corresponding to the source RS is configured for the target SRS resource set, the uplink beam training mode may be determined based on a configuration situation of the second network signaling.

Optionally, in a case that the second network signaling includes a preset spatial range parameter, the determining the uplink beam training mode based on second network signaling may include:

in a case that the preset spatial range parameter is not set a value or is set to 0, determining that the uplink beam training mode includes: transmitting information on all SRS resources in the target SRS resource set on a target uplink transmit beam corresponding to a source RS, where the source RS corresponds to the first spatial relation information.

It can be understood that when the first spatial relation information corresponding to the source RS is configured for the target SRS resource set, but the corresponding spatial range cannot be determined based on the preset spatial range parameter in the second network signaling, uplink beam training may be performed by transmitting the information on all the SRS resources in the target SRS resource set on the fixed target uplink transmit beam.

That the first spatial range parameter is not set a value may be understood as that the first spatial range parameter is a null value NULL or the first spatial range parameter is not configured in the second network signaling.

In a case that the preset spatial range parameter is not set to 0, it is determined that the uplink beam training mode includes: transmitting, through beam sweeping based on the first spatial relation information and a spatial range corresponding to the preset spatial range parameter, information on all SRS resources included in the target SRS resource set.

It can be understood that when the first spatial relation information corresponding to the source RS is configured for the target SRS resource set, and the corresponding spatial range may be determined based on the preset spatial range parameter in the second network signaling, the information on all the SRS resources in the target SRS resource set may be sent through beam sweeping, that is, beam sweeping is performed within the spatial range corresponding the preset spatial range parameter around a target uplink transmit beam corresponding to the first spatial relation information, to implement uplink beam training.

The preset spatial range parameter includes an angle parameter, and the spatial range corresponding to the preset spatial range parameter may include angle range information.

Optionally, in a case that the second network signaling includes preset indication information indicating whether to perform beam sweeping, the determining the uplink beam training mode based on second network signaling may include:

in a case that the preset indication information does not instruct to perform beam sweeping, determining that the uplink beam training mode includes: transmitting information on all SRS resources in the target SRS resource set on a target uplink transmit beam corresponding to a source RS, where the source RS corresponds to the first spatial relation information.

It can be understood that when the preset indication information configured by using the second network signaling does not indicate to perform beam sweeping, uplink beam training may be performed by transmitting the information on all the SRS resources in the target SRS resource set on the fixed target uplink transmit beam.

In a case that the preset indication information instructs to perform beam sweeping, it is determined that the uplink beam training mode includes: transmitting, through beam sweeping based on a second spatial range and the first spatial relation information, information on all SRS resources included in the target SRS resource set.

It can be understood that when the preset indication information configured by using the second network signaling indicates to perform beam sweeping, the information on all the SRS resources in the target SRS resource set may be sent through beam sweeping, that is, beam sweeping is performed within the second spatial range around the target uplink transmit beam corresponding to the first spatial relation information, to implement uplink beam training.

Optionally, the second spatial range may be determined by the terminal device, or the spatial range may be configured based on network signaling, where the spatial range may include angle range information, and the network signaling used for configuring the second spatial range may include RRC signaling or MAC CE signaling or DCI signaling.

(4) In a case that the first result is that the first spatial relation information is not configured for the target SRS resource set, it is determined that the uplink beam training mode includes:

transmitting, through beam sweeping based on a third spatial range, information on all SRS resources included in the target SRS resource set.

It can be understood that when the first spatial relation information is not configured for the target SRS resource set, the information on the SRS resources in the target SRS resource set may be sent through beam sweeping, that is, beam sweeping is performed within the third spatial range, to implement uplink beam training.

Optionally, the third spatial range may be determined by the terminal device, or the spatial range may be configured based on network signaling, where the spatial range may include angle range information, and the network signaling used for configuring the third spatial range may include RRC signaling or MAC CE signaling or DCI signaling.

Optionally, when beam sweeping is performed within the third spatial range, sweeping may be performed around a specified beam within the third spatial range, or sweeping may be randomly performed within the spatial range. When sweeping is performed based on the specified beam, determining may be performed by the terminal device. For example, the terminal device first determines required spatial relation information for the target SRS resource set, and then determines the specified beam based on the spatial relation information. When determining the spatial relation information, the terminal device may determine the current required spatial relation information based on spatial relation information used by an SRS resource in the target SRS resource set last time. Certainly, the specified beam may be alternatively configured based on network signaling.

Embodiment 2 of Determining the Uplink Beam Training Mode

In this embodiment, the determining an uplink beam training mode of the target antenna set may include:
obtaining second configuration information corresponding to the target SRS resource set; and
determining the uplink beam training mode based on the second configuration information.

It can be understood that different uplink beam training modes may be adapted based on different specific content included in the existing second configuration information of the target SRS resource set. The following several cases are included:

(1) The uplink beam training mode is determined based on whether the second configuration information includes a first preset parameter, where the first preset parameter is another parameter that is of the target SRS resource set and that does not include spatial relation information.

Optionally, in a case that the second configuration information includes the first preset parameter, it is determined that the uplink beam training mode includes: transmitting information on all SRS resources included in the target SRS resource set on a first uplink transmit beam; and in a case that the second configuration information does not include the first preset parameter, it is determined that the uplink beam training mode includes: transmitting, through beam sweeping, information on all SRS resources included in the target SRS resource set.

Alternatively, optionally, in a case that the second configuration information includes the first preset parameter, it is determined that the uplink beam training mode includes: transmitting, through beam sweeping, information on all SRS resources included in the target SRS resource set; and in a case that the second configuration information does not include the first preset parameter, it is determined that the uplink beam training mode includes: transmitting information on all SRS resources included in the target SRS resource set on a first uplink transmit beam.

The first uplink transmit beam may be determined by the terminal device or may be configured by using network signaling. Based on a beam corresponding to a downlink reference signal resource, an uplink reference signal resource, or third spatial relation information indicated by other network signaling, beam sweeping may be performed within another spatial range determined by the terminal device or specified by using the network signaling, that is, beam sweeping may be performed within the another spatial range around the beam, to implement uplink beam training.

It can be understood that a process of performing beam training based on a fixed beam such as the first uplink transmit beam and a process of performing beam training based on beam sweeping is similar to the related content described above. Details are not described herein again.

(2) The uplink beam training mode is determined based on a value of a first preset parameter in the second configuration information, where the first preset parameter is another parameter that is of the target SRS resource set and that does not include spatial relation information.

Optionally, in a case that the value of the first preset parameter is a first value, it is determined that the uplink beam training mode includes: transmitting information on all SRS resources included in the target SRS resource set on a second uplink transmit beam; and in a case that the value of the first preset parameter is a second value, it is determined that the uplink beam training mode includes: transmitting, through beam sweeping, information on all SRS resources included in the target SRS resource set.

Alternatively, in a case that the value of the first preset parameter is a second value, it is determined that the uplink beam training mode includes: transmitting information on all SRS resources included in the target SRS resource set on a second uplink transmit beam; and in a case that the value of the first preset parameter is a first value, it is determined that the uplink beam training mode includes: transmitting, through beam sweeping, information on all SRS resources included in the target SRS resource set.

The second uplink transmit beam may be determined by the terminal device or may be configured by using network signaling. Based on a beam corresponding to a downlink reference signal resource, an uplink reference signal resource, or third spatial relation information indicated by other network signaling, beam sweeping may be performed within another spatial range determined by the terminal device or specified by using the network signaling.

It can be understood that a process of performing beam training based on a fixed beam such as the second uplink transmit beam and a process of performing beam training based on beam sweeping is similar to the related content described above. Details are not described herein again.

Optionally, the first preset parameter may be set as a related parameter of the target SRS resource set based on a specific situation, and the first value and the second value may be determined based on selection of the first preset parameter.

Embodiment 3 of Determining the Uplink Beam Training Mode

In this embodiment, the determining an uplink beam training mode of the target antenna set may include:

determining whether second spatial relation information is configured for each SRS resource in the target SRS resource set accordingly; and determining the uplink beam training mode based on a second result.

It can be understood that a beam required for uplink beam training on the target SRS resource set may be indicated based on second spatial relation information corresponding to each SRS resource in the target SRS resource set, that is, a source RS corresponding to each SRS resource in the target SRS resource set is indicated based on the second spatial relation information, and an uplink transmit beam used by the source RS is used for uplink beam training based on the target SRS resource set. In this way, whether the second spatial relation information is configured for each SRS resource in the target SRS resource set affects determining of the uplink beam training mode, and different uplink beam training modes may be adapted based on different results. Optionally, the following several cases are included:

(1) In a case that the second result is that the second spatial relation information is not configured for each SRS resource in the target SRS resource set accordingly, it is determined that the uplink beam training mode includes: transmitting, through beam sweeping based on a fourth spatial range, information on all SRS resources included in the target SRS resource set.

(2) In a case that the second result is that different second spatial relation information is configured for each SRS resource in the target SRS resource set accordingly, it is determined that the uplink beam training mode includes: transmitting information on each SRS resource on a target uplink transmit beam corresponding to a source RS, where the source RS is in a one-to-one correspondence with the second spatial relation information.

(3) In a case that the second result is that same second spatial relation information is configured for each SRS resource in the target SRS resource set, it is determined that the uplink beam training mode includes: transmitting information on all SRS resources in the target SRS resource set on a target uplink transmit beam corresponding to a source RS, where the source RS corresponds to the second spatial relation information.

(4) In a case that the second result is that same second spatial relation information is configured for each SRS resource in the target SRS resource set, it is determined that the uplink beam training mode includes: transmitting, through beam sweeping based on a fifth spatial range and a target uplink transmit beam corresponding to a source RS, information on all SRS resources included in the target SRS resource set, where the source RS corresponds to the second spatial relation information.

Optionally, the fourth spatial range and the fifth spatial range may be determined by the terminal device, or the spatial ranges may be configured based on network signaling, where the spatial range may include angle range information, and the network signaling used for configuring the fourth spatial range and the fifth spatial range may include RRC signaling or MAC CE signaling or DCI signaling.

It can be understood that a process of performing beam training based on a fixed beam such as the target uplink transmit beam and a process of performing beam training based on beam sweeping is similar to the related content described above. Details are not described herein again.

Embodiment 4 of Determining the Uplink Beam Training Mode

In this embodiment, the determining an uplink beam training mode of the target antenna set may include:
obtaining third configuration information corresponding to an SRS resource in the target SRS resource set; and
determining the uplink beam training mode based on the third configuration information.

It can be understood that different uplink beam training modes may be adapted based on different specific content included in the existing third configuration information of each SRS resource in the target SRS resource set. The following several cases may be included:

(1) The uplink beam training mode is determined based on whether the third configuration information includes a second preset parameter, where the second preset parameter is another parameter that is of the SRS resource and that does not include spatial relation information.

Optionally, in a case that the third configuration information includes the second preset parameter, it is determined that the uplink beam training mode includes: transmitting information on all SRS resources included in the target SRS resource set on a third uplink transmit beam; and
in a case that the third configuration information does not include the second preset parameter, it is determined that the uplink beam training mode includes: transmitting, through beam sweeping, information on all SRS resources included in the target SRS resource set.

Alternatively, optionally, in a case that the third configuration information includes the second preset parameter, it is determined that the uplink beam training mode includes: transmitting, through beam sweeping, information on all SRS resources included in the target SRS resource set; and
in a case that the third configuration information does not include the second preset parameter, it is determined that the uplink beam training mode includes: transmitting information on all SRS resources included in the target SRS resource set on a third uplink transmit beam.

The third uplink transmit beam may be determined by the terminal device or may be configured by using network signaling. Based on a beam corresponding to a downlink reference signal resource, an uplink reference signal resource, or third spatial relation information indicated by other network signaling, beam sweeping may be performed within another spatial range determined by the terminal device or specified by using the network signaling.

It can be understood that a process of performing beam training based on a fixed beam such as the third uplink transmit beam and a process of performing beam training based on beam sweeping is similar to the related content described above. Details are not described herein again.

(2) The uplink beam training mode is determined based on a value of a second preset parameter in the third configuration information, where the second preset parameter is another parameter that is of the SRS resource and that does not include spatial relation information.

Optionally, in a case that the value of the second preset parameter is a third value, it is determined that the uplink beam training mode includes: transmitting information on all SRS resources included in the target SRS resource set on a fourth uplink transmit beam; and
in a case that the value of the second preset parameter is a fourth value, it is determined that the uplink beam training mode includes: transmitting, through beam sweeping, information on all SRS resources included in the target SRS resource set.

Alternatively, optionally, in a case that the value of the second preset parameter is a fourth value, it is determined that the uplink beam training mode includes: transmitting information on all SRS resources included in the target SRS resource set on a fourth uplink transmit beam; and
in a case that the value of the second preset parameter is a third value, it is determined that the uplink beam training mode includes: transmitting, through beam sweeping, information on all SRS resources included in the target SRS resource set.

The fourth uplink transmit beam may be determined by the terminal device or may be configured by using network signaling. Based on a beam corresponding to a downlink reference signal resource, an uplink reference signal resource, or third spatial relation information indicated by other network signaling, beam sweeping may be performed within another spatial range determined by the terminal device or specified by using the network signaling.

It can be understood that a process of performing beam training based on a fixed beam such as the fourth uplink transmit beam and a process of performing beam training based on beam sweeping is similar to the related content described above. Details are not described herein again.

Optionally, when the third value is ON, the fourth value is OFF; or when the third value is OFF, the fourth value is ON. Certainly, other values may be taken based on a specific situation.

Optionally, the second preset parameter includes at least one of a repetition parameter or a frequency hopping parameter.

Embodiment 5 of Determining the Uplink Beam Training Mode

In this embodiment, the determining an uplink beam training mode of the target antenna set may include:
determining, based on third network signaling, whether the uplink beam training mode is to send, through beam sweeping, information on all SRS resources included in the target SRS resource set.

It can be understood that the uplink beam training mode is directly indicated through the third network signaling. This manner is accurate and effective.

Optionally, in a case that it is determined that the uplink beam training mode is to transmit an SRS resource in the target SRS resource set through beam sweeping, the uplink beam training method further includes:

determining a fifth uplink transmit beam corresponding to a first downlink reference signal resource, a first uplink reference signal resource, or third spatial relation information indicated based on a sixth spatial range and/or fourth network signaling, to perform beam sweeping.

It can be understood that sweeping may be randomly performed within the sixth spatial range, or the beam may be determined based on the first downlink reference signal resource, the first uplink reference signal resource, or the third spatial relation information indicated by the fourth network signaling, to perform beam sweeping around the beam within the sixth spatial range to complete uplink beam training; or beam sweeping may be performed based on the beam determined based on the first downlink reference signal resource, the first uplink reference signal resource, or the third spatial relation information indicated by the fourth network signaling.

Optionally, the sixth spatial range may be determined by the terminal device, or the spatial range may be configured based on network signaling, where the spatial range may include angle range information, and the network signaling used for configuring the sixth spatial range may include RRC signaling or MAC CE signaling or DCI signaling.

Optionally, in a case that it is determined, based on the third network signaling, that the uplink beam training mode is not to send, through beam sweeping, information on all SRS resources included in the target SRS resource set, it is determined that the uplink beam training mode includes:

determining a sixth uplink transmit beam corresponding to a second downlink reference signal resource, a second uplink reference signal resource, or fourth spatial relation information indicated by fifth network signaling; and transmitting information on all SRS resources included in the target SRS resource set on the sixth uplink transmit beam, to perform beam training.

It can be understood that in a case that the information on all the SRS resources included in the target SRS resource set is sent without beam sweeping based on the third network signaling, a fixed beam such as the sixth uplink transmit beam may be determined based on the second downlink reference signal resource, the second uplink reference signal resource, or the fourth spatial relation information indicated by the fifth network signaling, to transmit the information on all the SRS resources included in the target SRS resource set, so as to perform beam training.

Optionally, the third network signaling, the fourth network signaling, the fifth network signaling, and sixth network signaling may include RRC signaling, DCI signaling, or MAC CE signaling.

Optionally, the source RS in the above embodiment may include at least one of a synchronization signal block (SSB), a channel state information-reference signal (CSI-RS), and a SRS.

S105: Perform beam training based on the uplink beam training mode.

It can be understood that beam training is performed based on the uplink beam training mode determined based on network signaling, so that an optimal uplink transmit beam and an optimal uplink receive beam can be determined. In this case, the terminal device may perform uplink transmission based on the optimal uplink transmit beam and the optimal uplink receive beam, to improve frequency band utilization and uplink transmission efficiency, thereby improving quality of a wireless communication connection.

It can be understood that the network side device may configure a usage parameter of an RS resource set through RRC signaling. Optionally, when the usage parameter is configured as beam management (beam management), it indicates that for each RS resource set, only one RS resource can be sent at one uplink transmit moment, and for RS resources in different RS resource sets, the RS resources may be transmitted by the terminal device at the same time.

In some embodiments of the present disclosure, for the terminal device with the plurality of antenna sets, the target antenna set required for uplink beam training is determined from the plurality of antenna sets based on network signaling, and the uplink beam training mode of the target antenna set is determined, to reduce overheads and a delay of uplink beam training.

It can be understood that in some embodiments of the present disclosure, network signaling may be used to indicate whether the terminal device performs local beam sweeping, an antenna set on which beam sweeping is performed, and a beam range within which beam sweeping is performed or a beam around which beam sweeping is performed.

The uplink beam training method according to an embodiment of the present disclosure is described above in detail with reference to FIG. 1. The uplink beam training method according to another embodiment of the present disclosure is described below in detail with reference to FIG. 2. It should be noted that interaction between the terminal device and the network side device described from the network device side is the same as the descriptions on the terminal device side. To avoid repetition, the related descriptions are omitted appropriately.

Figure 2:
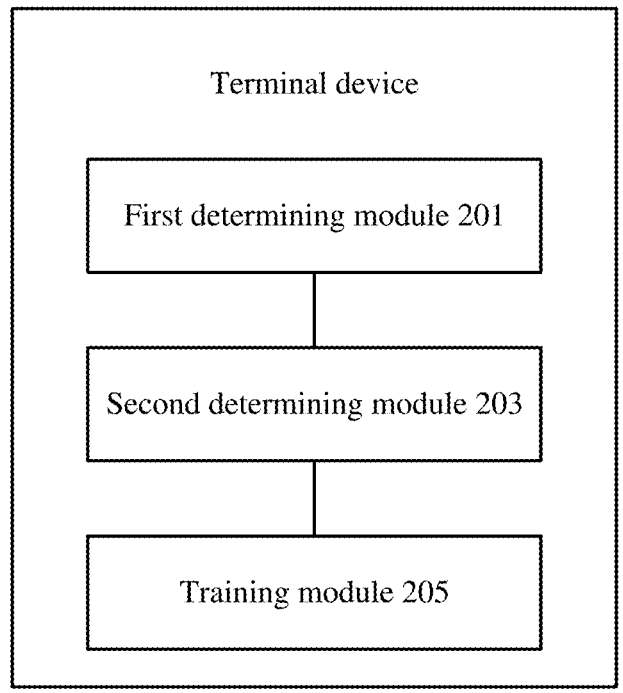
FIG. 2 is a schematic flowchart of an uplink beam training method applied to a network side device according to some embodiments of the present disclosure.

As shown in FIG. 2, some embodiments of the present disclosure provide an uplink beam training method. The method is applied to a network side device and includes:

S201: Generate first network signaling.

Optionally, the first network signaling includes antenna set related information, and the antenna set related information is used to indicate a target antenna set.

Optionally, the antenna set related information includes one piece of the following information:

antenna set identifier information;

RS resource information, where there is an association relationship between the RS resource information and an antenna set; and RS resource set information, where there is an association relationship between the RS resource set information and an antenna set.

Optionally, in a case that the antenna set related information is the RS resource set information, the RS resource set information is used to indicate a target RS resource set and the target antenna set corresponding to the target RS resource set.

S203: Transmit the first network signaling, where the first network signaling is used to indicate a target antenna set in a plurality of antenna sets supported by a terminal device.

Optionally, the first network signaling is used to trigger a target RS resource set, and the target RS resource set is used to indicate the target antenna set.

Optionally, the uplink beam training method further includes:
determining an association relationship between an RS resource set and an antenna set based on capability parameter information of the terminal device;
placing the association relationship in first configuration information corresponding to the target RS resource set; and
transmitting the first configuration information to enable the terminal device to determine the target antenna set based on the target RS resource set and the association relationship.

Optionally, the target RS resource set includes a target SRS resource set.

Optionally, the uplink beam training method further includes:
determining a first result, where the first result includes that first spatial relation information is configured for the target SRS resource set or first spatial relation information is not configured for the target SRS resource set, and the first result is used by the terminal device to determine an uplink beam training mode of the target antenna set.

Optionally, in a case that the first result is that the first spatial relation information is configured for the target SRS resource set, the method further includes:
generating second network signaling; and
transmitting the second network signaling, where the second network signaling is used to indicate the uplink beam training mode.

Optionally, the second network signaling includes one of the following:
a preset spatial range parameter indicating the uplink beam training mode based on a setting situation of the preset spatial range parameter; and
preset indication information, where the preset indication information is used to indicate whether to perform beam sweeping and is used by the terminal device to determine the uplink beam training mode.

Optionally, the uplink beam training method further includes:
transmitting second configuration information corresponding to the target SRS resource set, where the second configuration information is used by the terminal device to determine the uplink beam training mode of the target antenna set.

Optionally, the second configuration information includes a first preset parameter or does not include a first preset parameter; or
in a case that the second configuration information includes a first preset parameter, a value of the first preset parameter includes a first value or a second value.

Optionally, the uplink beam training method further includes:
determining a second result, where the second result includes that second spatial relation information is configured for each SRS resource in the target SRS resource set accordingly or second spatial relation information is not configured for each SRS resource in the target SRS resource set, and the second result is used by the terminal device to determine an uplink beam training mode of the target antenna set.

Optionally, the uplink beam training method further includes:
transmitting third configuration information corresponding to each SRS resource in the target SRS resource set, where the third configuration information is used by the terminal device to determine an uplink beam training mode of the target antenna set.

Optionally, the third configuration information includes a second preset parameter or does not include a second preset parameter;
or
in a case that the third configuration information includes a second preset parameter, a value of the second preset parameter includes a third value or a fourth value.

Optionally, the second preset parameter includes at least one of a repetition parameter or a frequency hopping parameter.

Optionally, the uplink beam training method further includes:
generating third network signaling; and
transmitting the third network signaling, where the third network signaling is used to indicate whether an uplink beam training mode of the target antenna set is to transmit information on all SRS resources in the target SRS resource set through beam sweeping.

Optionally, in a case that the third network signaling indicates that the uplink beam training mode is to transmit information on all SRS resources in the target SRS resource set through beam sweeping,
the method further includes:
generating fourth network signaling; and
transmitting the fourth network signaling, where the fourth network signaling is used to indicate a beam corresponding to a downlink reference signal resource, an uplink reference signal resource, or third spatial relation information, to perform beam sweeping.

Optionally, in a case that the third network signaling indicates that the uplink beam training mode is not to transmit information on all SRS resources in the target SRS resource set through beam sweeping, the method further includes:
generating fifth network signaling; and
transmitting the fifth network signaling, where the fifth network signaling is used to indicate a beam corresponding to a second downlink reference signal resource, a second uplink reference signal resource, or fourth spatial relation information, to perform beam sweeping.

In some embodiments of the present disclosure, network signaling is used to specify the target antenna set in the plurality of antenna sets supported by the terminal device, and the terminal device is enabled to perform local uplink beam training after determining the uplink beam training mode of the target antenna set, to reduce overheads and a delay of uplink beam training.

Figure 3:
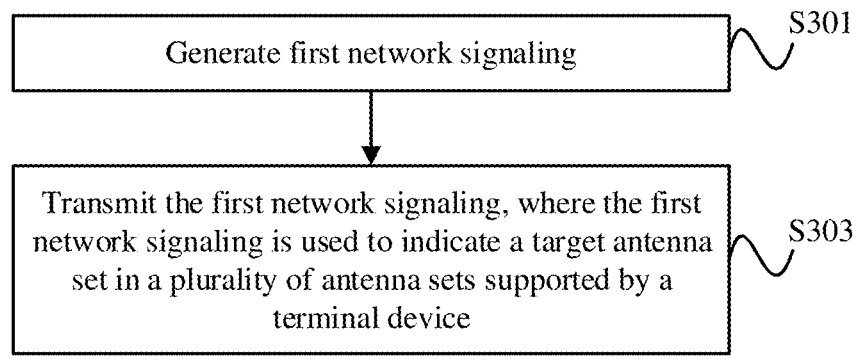
FIG. 3 is a schematic structural diagram 1 of a terminal device according to some embodiments of the present disclosure.

As shown in FIG. 3, some embodiments of the present disclosure provide a terminal device. The terminal device includes:
a first determining module 301, configured to determine a target antenna set in a plurality of supported antenna sets based on first network signaling;
a second determining module 303, configured to determine an uplink beam training mode of the target antenna set; and
a training module 305, configured to perform beam training based on the uplink beam training mode.

Optionally, the first determining module 301 may include:
a first obtaining unit, configured to obtain antenna set related information in the first network signaling; and a first determining unit, configured to determine the target antenna set based on the antenna set related information.

Optionally, the antenna set related information includes one piece of the following information:
antenna set identifier information;
RS resource information, where there is an association relationship between the RS resource information and an antenna set; and
RS resource set information, where there is an association relationship between the RS resource set information and an antenna set.

Optionally, in a case that the antenna set related information is the RS resource set information, the first determining unit may include:
an indication subunit, configured to indicate a target RS resource set based on the RS resource set information; and
a first determining subunit, configured to determine, based on the association relationship between the RS resource set information and an antenna set, the target antenna set corresponding to the target RS resource set.

Optionally, the first determining module 301 may further include:
a triggering unit, configured to trigger a target RS resource set based on the first network signaling; and
a second determining unit, configured to determine, based on an association relationship between an RS resource set and an antenna set, the target antenna set corresponding to the target RS resource set.

Optionally, the second determining unit may include:
an obtaining subunit, configured to obtain first configuration information, where the first configuration information is information configured by a network device for the target RS resource set based on capability parameter information of the terminal device; and
a second determining subunit, configured to determine the target antenna set based on the association relationship included in the first configuration information.

Optionally, the capability parameter information of the terminal device includes:
information about a maximum quantity of antenna sets supported by the terminal device and information about a maximum quantity of supported beams in each antenna set.

Optionally, the target RS resource set includes a target SRS resource set.

Optionally, the second determining module 303 may include:
a third determining unit, configured to determine whether first spatial relation information is configured for the target SRS resource set; and
a fourth determining unit, configured to determine the uplink beam training mode based on a first result.

Optionally, the fourth determining unit is configured to: in a case that the first result is that the first spatial relation information is configured for the target SRS resource set, determine that the uplink beam training mode includes:
transmitting information on all SRS resources in the target SRS resource set on a target uplink transmit beam corresponding to a source RS, where the source RS corresponds to the first spatial relation information; or
transmitting, through beam sweeping based on a first spatial range and the first spatial relation information, information on all SRS resources included in the target SRS resource set.

Optionally, in a case that the first result is that the first spatial relation information is configured for the target SRS resource set, the fourth determining unit may be configured to:
determine the uplink beam training mode based on second network signaling.

Optionally, in a case that the second network signaling includes a preset spatial range parameter, the fourth determining unit may be configured to:
in a case that the preset spatial range parameter is not set a value or is set to 0, determine that the uplink beam training mode includes: transmitting information on all SRS resources in the target SRS resource set on a target uplink transmit beam corresponding to a source RS, where the source RS corresponds to the first spatial relation information; and
in a case that the preset spatial range parameter is not set to 0, determine that the uplink beam training mode includes: transmitting, through beam sweeping based on the first spatial relation information and a spatial range corresponding to the preset spatial range parameter, information on all SRS resources included in the target SRS resource set.

Optionally, in a case that the second network signaling includes preset indication information indicating whether to perform beam sweeping, the fourth determining unit may be configured to:
in a case that the preset indication information does not instruct to perform beam sweeping, determine that the uplink beam training mode includes: transmitting information on all SRS resources in the target SRS resource set on a target uplink transmit beam corresponding to a source RS, where the source RS corresponds to the first spatial relation information;
and in a case that the preset indication information instructs to perform beam sweeping, determine that the uplink beam training mode includes: transmitting, through beam sweeping based on a second spatial range and the first spatial relation information, information on all SRS resources included in the target SRS resource set.

Optionally, the fourth determining unit is configured to: in a case that the first result is that the first spatial relation information is not configured for the target SRS resource set, determine that the uplink beam training mode includes:
transmitting, through beam sweeping based on a third spatial range, information on all SRS resources included in the target SRS resource set.

Optionally, the second determining module 303 may include:
a second obtaining unit, configured to obtain second configuration information corresponding to the target SRS resource set; and
a fifth determining unit, configured to determine the uplink beam training mode based on the second configuration information.

Optionally, the fifth determining unit may be configured to:
determine the uplink beam training mode based on whether the second configuration information includes a first preset parameter; or
determine the uplink beam training mode based on a value of a first preset parameter in the second configuration information, where
the first preset parameter is another parameter that is of the target SRS resource set and that does not include spatial relation information.

Optionally, the fifth determining unit may be further configured to:
  in a case that the second configuration information includes the first preset parameter, determine that the uplink beam training mode includes: transmitting information on all SRS resources included in the target SRS resource set on a first uplink transmit beam; and
  in a case that the second configuration information does not include the first preset parameter, determine that the uplink beam training mode includes: transmitting, through beam sweeping, information on all SRS resources included in the target SRS resource set;
  or
  in a case that the second configuration information includes the first preset parameter, determine that the uplink beam training mode includes: transmitting, through beam sweeping, information on all SRS resources included in the target SRS resource set; and
  in a case that the second configuration information does not include the first preset parameter, determine that the uplink beam training mode includes: transmitting information on all SRS resources included in the target SRS resource set on a first uplink transmit beam.

Optionally, the fifth determining unit may be further configured to:
  in a case that the value of the first preset parameter is a first value, determine that the uplink beam training mode includes: transmitting information on all SRS resources included in the target SRS resource set on a second uplink transmit beam; and
  in a case that the value of the first preset parameter is a second value, determine that the uplink beam training mode includes: transmitting, through beam sweeping, information on all SRS resources included in the target SRS resource set;
  or
  in a case that the value of the first preset parameter is a second value, determine that the uplink beam training mode includes: transmitting information on all SRS resources included in the target SRS resource set on a second uplink transmit beam; and
  in a case that the value of the first preset parameter is a first value, determine that the uplink beam training mode includes: transmitting, through beam sweeping, information on all SRS resources included in the target SRS resource set.

Optionally, the second determining module 203 may further include:
  a sixth determining unit, configured to determine whether second spatial relation information is configured for each SRS resource in the target SRS resource set accordingly; and
  a seventh determining unit, configured to determine the uplink beam training mode based on a second result.

Optionally, the seventh determining unit may be configured to:
  in a case that the second result is that the second spatial relation information is not configured for each SRS resource in the target SRS resource set accordingly, determine that the uplink beam training mode includes: transmitting, through beam sweeping based on a fourth spatial range, information on all SRS resources included in the target SRS resource set;
  in a case that the second result is that different second spatial relation information is configured for each SRS resource in the target SRS resource set accordingly, determine that the uplink beam training mode includes: transmitting information on each SRS resource on a target uplink transmit beam corresponding to a source RS, where the source RS is in a one-to-one correspondence with the second spatial relation information;
  in a case that the second result is that same second spatial relation information is configured for each SRS resource in the target SRS resource set, determine that the uplink beam training mode includes: transmitting information on all SRS resources in the target SRS resource set on a target uplink transmit beam corresponding to a source RS, where the source RS corresponds to the second spatial relation information; and
  in a case that the second result is that same second spatial relation information is configured for each SRS resource in the target SRS resource set, determine that the uplink beam training mode includes: transmitting, through beam sweeping based on a fifth spatial range and a target uplink transmit beam corresponding to a source RS, information on all SRS resources included in the target SRS resource set, where the source RS corresponds to the second spatial relation information.

Optionally, the second determining module 203 may further include:
  a third obtaining unit, configured to obtain third configuration information corresponding to an SRS resource in the target SRS resource set; and
  an eighth determining unit, configured to determine the uplink beam training mode based on the third configuration information.

Optionally, the eighth determining unit may be configured to:
  determine the uplink beam training mode based on whether the third configuration information includes a second preset parameter; or
  determine the uplink beam training mode based on a value of a second preset parameter in the third configuration information, where
  the second preset parameter is another parameter that is of the SRS resource and that does not include spatial relation information.

Optionally, the eighth determining unit may be further configured to:
  in a case that the third configuration information includes the second preset parameter, determine that the uplink beam training mode includes: transmitting information on all SRS resources included in the target SRS resource set on a third uplink transmit beam; and
  in a case that the third configuration information does not include the second preset parameter, determine that the uplink beam training mode includes: transmitting, through beam sweeping, information on all SRS resources included in the target SRS resource set;
  or
  in a case that the third configuration information includes the second preset parameter, determine that the uplink beam training mode includes: transmitting, through beam sweeping, information on all SRS resources included in the target SRS resource set; and
  in a case that the third configuration information does not include the second preset parameter, determine that the uplink beam training mode includes: transmitting information on all SRS resources included in the target SRS resource set on a third uplink transmit beam.

Optionally, the eighth determining unit may be further configured to:
  in a case that the value of the second preset parameter is a third value, determine that the uplink beam training mode includes: transmitting information on all SRS resources included in the target SRS resource set on a fourth uplink transmit beam; and in a case that the value of the second preset parameter is a fourth value, determine that the uplink beam training mode includes: transmitting, through beam sweeping, information on all SRS resources included in the target SRS resource set;

or in a case that the value of the second preset parameter is a fourth value, determine that the uplink beam training mode includes: transmitting information on all SRS resources included in the target SRS resource set on a fourth uplink transmit beam; and in a case that the value of the second preset parameter is a third value, determine that the uplink beam training mode includes: transmitting, through beam sweeping, information on all SRS resources included in the target SRS resource set.

Optionally, the second preset parameter includes at least one of a repetition parameter or a frequency hopping parameter.

Optionally, the second determining module 203 may further include:

a ninth determining unit, configured to determine, based on third network signaling, whether the uplink beam training mode is to send, through beam sweeping, information on all SRS resources included in the target SRS resource set.

Optionally, in a case that it is determined that the uplink beam training mode is to transmit an SRS resource in the target SRS resource set through beam sweeping, the second determining module 203 may further include:

a tenth determining unit, configured to determine a beam corresponding to a first downlink reference signal resource, a first uplink reference signal resource, or third spatial relation information indicated by a sixth spatial range and/or fourth network signaling, to perform beam sweeping.

Optionally, in a case that it is determined, based on the third network signaling, that the uplink beam training mode is not to send, through beam sweeping, information on all SRS resources include in the target SRS resource set, the second determining module 203 may be further configured to:

determine a sixth uplink transmit beam corresponding to a second downlink reference signal resource, a second uplink reference signal resource, or fourth spatial relation information indicated by fifth network signaling; and transmit information on all SRS resources included in the target SRS resource set on the sixth uplink transmit beam, to perform beam training.

Optionally, the source RS includes at least one of a SSB, a CSI-RS, and a SRS.

It can be understood that the terminal device provided in some embodiments of the present disclosure can implement the above uplink beam training method performed by the terminal device, and relevant descriptions of the uplink beam training method is applicable to the terminal device. Details are not described herein again.

In some embodiments of the present disclosure, for the terminal device with the plurality of antenna sets, the target antenna set required for uplink beam training is determined from the plurality of antenna sets based on network signaling, and the uplink beam training mode of the target antenna set is determined, to reduce overheads and a delay of uplink beam training.

Figure 4:
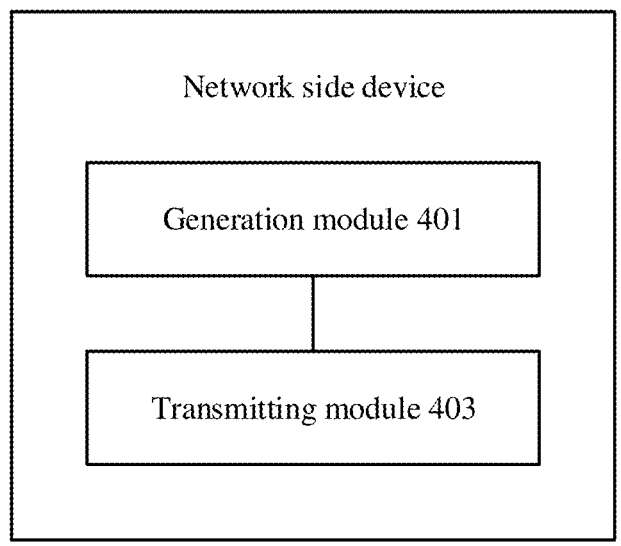
FIG. 4 is a schematic structural diagram 1 of a network side device according to some embodiments of the present disclosure.

As shown in FIG. 4, some embodiments of the present disclosure provide a network side device. The network side device includes:

a generation module 401, configured to generate first network signaling; and a transmitting module 403, configured to transmit the first network signaling, where the first network signaling is used to indicate a target antenna set in a plurality of antenna sets supported by a terminal device.

Optionally, the first network signaling includes antenna set related information, and the antenna set related information is used to indicate the target antenna set.

Optionally, the antenna set related information includes one piece of the following information:

antenna set identifier information;

RS resource information, where there is an association relationship between the RS resource information and an antenna set; and RS resource set information, where there is an association relationship between the RS resource set information and an antenna set.

Optionally, in a case that the antenna set related information is the RS resource set information, the RS resource set information is used to indicate a target RS resource set and the target antenna set corresponding to the target RS resource set.

Optionally, the first network signaling is used to trigger a target RS resource set, and the target RS resource set is used to indicate the target antenna set.

Optionally, the network side device may further include:

a first determining module, configured to determine an association relationship between an RS resource set and an antenna set based on capability parameter information of the terminal device; and a setting module, configured to place the association relationship in first configuration information corresponding to the target RS resource set, where the transmitting module is further configured to transmit the first configuration information to enable the terminal device to determine the target antenna set based on the target RS resource set and the association relationship.

Optionally, the target RS resource set includes a target SRS resource set.

Optionally, the network side device may further include:

a second determining module, configured to determine a first result, where the first result includes that first spatial relation information is configured for the target SRS resource set or first spatial relation information is not configured for the target SRS resource set, and the first result is used by the terminal device to determine an uplink beam training mode of the target antenna set.

Optionally, in a case that the second determining module determines that the first result is that the first spatial relation information is configured for the target SRS resource set, the generation module is further configured to generate second network signaling; and the transmitting module is further configured to transmit the second network signaling, where the second network signaling is used to indicate the uplink beam training mode.

Optionally, the second network signaling includes one of the following:
- a preset spatial range parameter indicating the uplink beam training mode based on a setting situation of the preset spatial range parameter; and
- preset indication information, where the preset indication information is used to indicate whether to perform beam sweeping and is used by the terminal device to determine the uplink beam training mode.

Optionally, the transmitting module is further configured to:
- transmit second configuration information corresponding to the target SRS resource set, where the second configuration information is used by the terminal device to determine the uplink beam training mode of the target antenna set.

Optionally, the second configuration information includes a first preset parameter or does not include a first preset parameter; or
- in a case that the second configuration information includes a first preset parameter, a value of the first preset parameter includes a first value or a second value.

Optionally, the network side device further includes:
- a third determining module, configured to determine a second result, where the second result includes that second spatial relation information is configured for each SRS resource in the target SRS resource set accordingly or second spatial relation information is not configured for each SRS resource in the target SRS resource set, and the second result is used by the terminal device to determine an uplink beam training mode of the target antenna set.

Optionally, the transmitting module is further configured to:
- transmit third configuration information corresponding to each SRS resource in the target SRS resource set, where the third configuration information is used by the terminal device to determine an uplink beam training mode of the target antenna set.

Optionally, the third configuration information includes a second preset parameter or does not include a second preset parameter; or in a case that the third configuration information includes a second preset parameter, a value of the second preset parameter includes a third value or a fourth value.

Optionally, the second preset parameter includes at least one of a repetition parameter or a frequency hopping parameter.

Optionally, the generation module is further configured to generate third network signaling; and
the transmitting module is further configured to transmit the third network signaling, where the third network signaling is used to indicate whether an uplink beam training mode of the target antenna set is to transmit information on all SRS resources in the target SRS resource set through beam sweeping.

Optionally, in a case that the third network signaling indicates that the uplink beam training mode is to transmit information on all SRS resources in the target SRS resource set through beam sweeping,
the generation module is further configured to generate fourth network signaling; and
the transmitting module is further configured to transmit the fourth network signaling, where the fourth network signaling is used to indicate a beam corresponding to a first downlink reference signal resource, a first uplink reference signal resource, or third spatial relation information, to perform beam sweeping.

Optionally, in a case that the third network signaling indicates that the uplink beam training mode is not to transmit information on all SRS resources in the target SRS resource set through beam sweeping,
the generation module is further configured to generate fifth network signaling; and
the transmitting module is further configured to transmit the fifth network signaling, where the fifth network signaling is used to indicate a beam corresponding to a second downlink reference signal resource, a second uplink reference signal resource, or fourth spatial relation information, to perform beam sweeping.

In some embodiments of the present disclosure, network signaling is used to specify the target antenna set in the plurality of antenna sets supported by the terminal device, and the terminal device is enabled to perform local uplink beam training after determining the uplink beam training mode of the target antenna set, to reduce overheads and a delay of uplink beam training.

Figure 5:
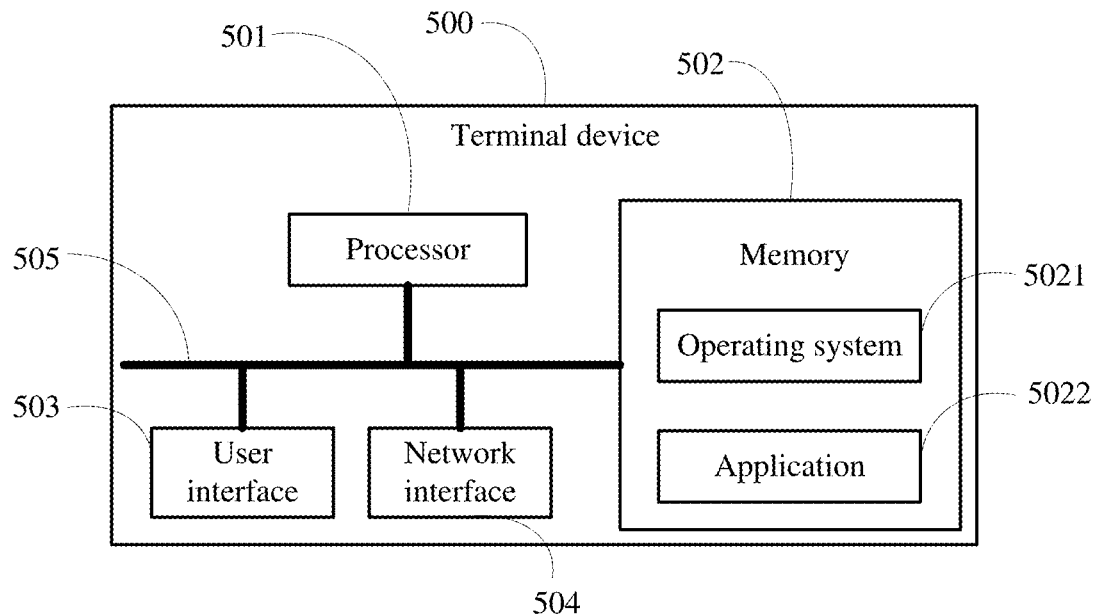
FIG. 5 is a schematic structural diagram 2 of a terminal device according to some embodiments of the present disclosure.

FIG. 5 is another block diagram of a terminal device according to an embodiment of the present disclosure. The terminal device 500 shown in FIG. 5 includes at least one processor 501, a memory 502, at least one network interface 504, and a user interface 503. All components of the terminal device 500 are coupled together by using the bus system 505. It may be understood that the bus system 505 is configured to implement a connection and communication between these components. In addition to a data bus, the bus system 505 may include a power bus, a control bus, and a status signal bus. However, for clear description, various types of buses in FIG. 5 are marked as the bus system 505.

The user interface 503 may include a display, a keyboard, or a clicking device, for example, a mouse, a trackball (trackball), a touch panel, or a touchscreen.

It may be understood that the memory 502 in this embodiment of the present disclosure may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The memory 502 in the system and the method that are described in the embodiments of the present disclosure is to include but is not limited to these memories and a memory of any other proper type.

In some implementation manners, the memory 502 stores the following element, an executable module or a data structure, or a subset thereof, or an extension set thereof: an operating system 5021 and an application 5022.

The operating system 3021 includes various system programs, for example, a framework layer, a kernel library layer, and a driver layer, and is configured to implement various basic services and process hardware-based tasks.

The application 5022 includes various applications, for example, a media player, and a browser, to implement various application services. A program implementing the method in the embodiments of the present disclosure may be included in the application program 5022.

In some embodiments of the present disclosure, the terminal device 500 further includes a computer program that is stored in the memory 509 and that can run on the processor 501, and when the processor 501 executes the computer program, the following steps are implemented:
- determining a target antenna set in a plurality of supported antenna sets based on first network signaling;
- determining an uplink beam training mode of the target antenna set; and
- performing beam training based on the uplink beam training mode.

The method disclosed in the embodiment of the present disclosure may be applied to the processor 501 or implemented by the processor 501. The processor 501 may be an integrated circuit chip having a signal processing capability. During implementation, the steps of the foregoing method can be completed by hardware integrated logic circuits in the processor 501 or instructions in the form of software. The foregoing processor 501 may be a general-purpose processor, a digital signal processor (DSP), an application specific integrated circuit (ASIC), a field programmable gate array (FPGA) or another programmable logic component, a discrete gate or a transistor logic component, or a discrete hardware component. The processor 501 processor may implement or perform the methods, the steps, and logical block diagrams that are disclosed in the embodiments of the present disclosure. The general-purpose processor may be a microprocessor or may be any conventional processor or the like. The steps of the method disclosed in the embodiments of the present disclosure may be directly performed by a hardware decoding processor or by a combination of hardware and software modules in the decoding processor. The software module may be located in a mature non-transitory computer-readable storage medium in this field such as a random access memory, a flash memory, a read-only memory, a programmable read-only memory or an electrically erasable programmable memory, or a register. The non-transitory computer-readable storage medium is located in the memory 502, and the processor 501 reads information in the memory 502 and completes the steps in the foregoing method in combination with hardware of the processor 501. Specifically, the non-transitory computer-readable storage medium stores a computer program, and when the processor 501 executes the computer program, the steps of the foregoing uplink beam training method are implemented.

It may be understood that the embodiments described in the embodiments of the present disclosure may be implemented by hardware, software, firmware, middleware, microcode, or a combination thereof. For hardware implementation, a processing unit may be implemented in one or more Application Specific Integrated Circuits (ASIC), digital signal processors (DSP), digital signal processing devices (DSPD), programmable logic devices (PLD), field-programmable gate arrays (FPGA), general purpose processors, controllers, microcontrollers, microprocessors, or other electronic units or a combination thereof used to perform the functions in the present disclosure.

For software implementation, the technology in the embodiments of the present disclosure may be implemented through modules (for example, procedures or functions) that perform the functions in the embodiments of the present disclosure. Software code may be stored in the memory and executed by the processor. The memory may be implemented inside or outside the processor.

The terminal device 500 can implement each process implemented by the terminal device in the foregoing embodiments. To avoid repetition, details are not described herein again.

In some embodiments of the present disclosure, for the terminal device with the plurality of antenna sets, the target antenna set required for uplink beam training is determined from the plurality of antenna sets based on network signaling, and the uplink beam training mode of the target antenna set is determined, to reduce overheads and a delay of uplink beam training.

Figure 6:
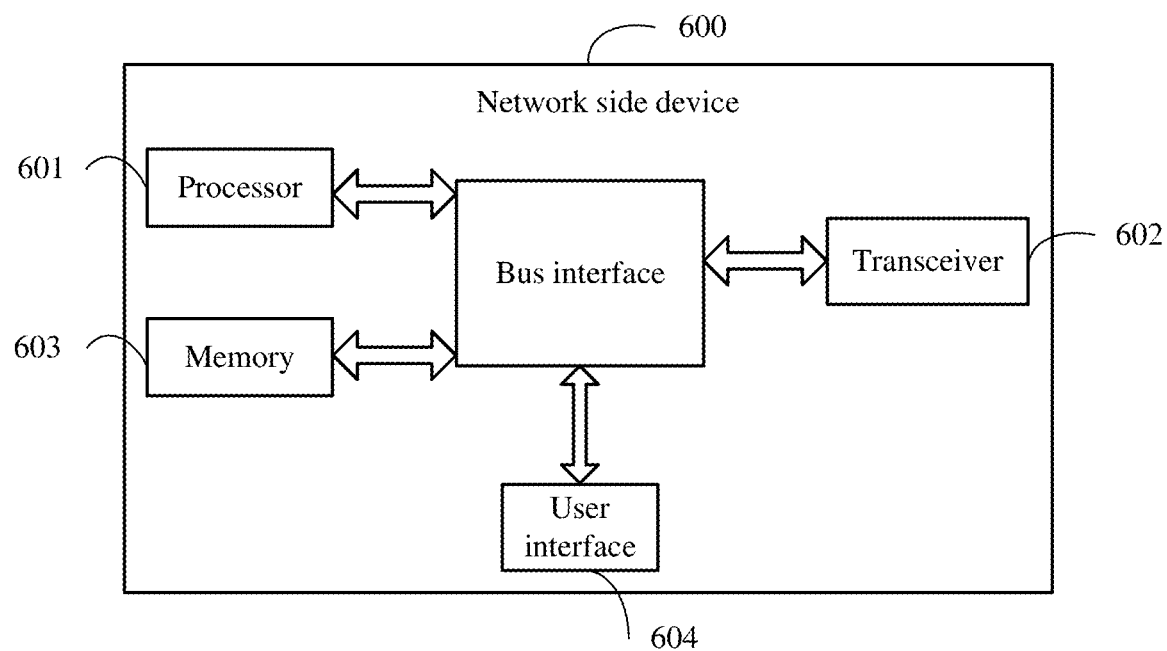
FIG. 6 is a schematic structural diagram 2 of a network side device according to some embodiments of the present disclosure.

FIG. 6 is another block diagram of a network side device according to some embodiments of the present disclosure. The network side device 600 shown in FIG. 6 includes a processor 601, a transceiver 602, a memory 603, a user interface 604, and a bus interface.

In some embodiments of the present disclosure, the network side device 600 further includes a computer program that is stored in the memory 603 and that can run on the processor 601, and when the processor 601 executes the computer program, the following steps are implemented:
- generating first network signaling; and
- transmitting the first network signaling, where the first network signaling is used to indicate a target antenna set in a plurality of antenna sets supported by a terminal device.

In FIG. 6, a bus architecture may include any quantity of interconnected buses and bridges. Specifically, various circuits of one or more processors represented by the processor 601 and a memory represented by the memory 603 are interconnected. The bus architecture may further connect together various other circuits of a peripheral device, a voltage stabilizer, a power management circuit, and the like, which are known in this art and will not be further described herein. The bus interface provides an interface. The transceiver 602 may be a plurality of components. To be specific, the transceiver 602 includes a transmitter and a receiver, and provides a unit configured to communicate with various other apparatuses on a transmission medium. For different user equipment, the user interface 604 may alternatively be an interface for externally and internally connecting required equipment. The connected equipment includes but is not limited to a keypad, a display, a speaker, a microphone, a joystick, and the like.

The processor 601 is responsible for bus architecture management and general processing. The memory 603 may store data used by the processor 601 when the processor 601 performs an operation.

In some embodiments of the present disclosure, network signaling is used to specify the target antenna set in the plurality of antenna sets supported by the terminal device, and the terminal device is enabled to perform local uplink beam training after determining the uplink beam training mode of the target antenna set, to reduce overheads and a delay of uplink beam training.

Optionally, some embodiments of the present disclosure further provide a terminal device, including a processor, a memory, and a computer program that is stored in the memory and that can run on the processor. When the processor executes the computer program, the foregoing processes of the uplink beam training method embodiment are implemented and a same technical effect can be achieved. To avoid repetition, details are not described herein again.

Some embodiments of the present disclosure further provide a non-transitory computer-readable storage medium. The non-transitory computer-readable storage medium stores a computer program, and when a processor executes the computer program, the foregoing processes of the uplink beam training method embodiment corresponding to the terminal device are implemented and a same technical effect can be achieved. To avoid repetition, details are not described herein again. The non-transitory computer-readable storage medium includes a read-only memory (Read-Only Memory, ROM for short), a random access memory (Random Access Memory, RAM for short), a magnetic disk, an optical disc, or the like.

Optionally, some embodiments of the present disclosure further provide a network side device, including a processor, a memory, and a computer program that is stored in the memory and that can run on the processor. When the processor executes the computer program, the foregoing processes of the uplink beam training method embodiment are implemented and a same technical effect can be achieved. To avoid repetition, details are not described herein again.

Some embodiments of the present disclosure further provide a non-transitory computer-readable storage medium. The non-transitory computer-readable storage medium stores a computer program, and when a processor executes the computer program, the foregoing processes of the uplink beam training method embodiment corresponding to the network side device are implemented and a same technical effect can be achieved. To avoid repetition, details are not described herein again. The non-transitory computer-readable storage medium includes a read-only memory (ROM for short), a random access memory (RAM for short), a magnetic disk, an optical disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the related art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

Those of ordinary skill in the art can realize that the exemplary units and algorithm steps described with reference to the embodiments disclosed in this specification can be implemented by electronic hardware or a combination of computer software and electronic hardware. Whether these functions are implemented by hardware or software depends on specific applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed operating process of the foregoing system, apparatus, and unit, refer to a corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may be or may not be physically separated, and the components displayed as units may be or may not be physical units, that is, may be located in one place or distributed on multiple network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a non-transitory computer-readable storage medium. Based on this understanding, the essence of the technical solutions of this disclosure, or the part contributing to the prior art, or some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of this disclosure. The storage medium includes various mediums, such as a USB flash disk, a removable hard disk, a ROM, a RAM, a magnetic disk, or an optical disc, that can store program code.

It may be understood that the embodiments described in the embodiments of the present disclosure may be implemented by hardware, software, firmware, middleware, microcode, or a combination thereof. For hardware implementation, a processing unit may be implemented in one or more Application Specific Integrated Circuits (ASIC), digital signal processors (DSP), digital signal processing devices (DSPD), programmable logic devices (PLD), field-programmable gate arrays (FPGA), general purpose processors, controllers, microcontrollers, microprocessors, or other electronic units or a combination thereof used to perform the functions in the present disclosure.

For software implementation, the technology in the embodiments of the present disclosure may be implemented through modules (for example, procedures or functions) that perform the functions in the embodiments of the present disclosure. Software code may be stored in the memory and executed by the processor. The memory can be implemented inside or outside the processor.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An uplink beam training method, comprising:
   determining, by a terminal device, a target antenna set in a plurality of supported antenna sets based on first network signaling;
   determining, by the terminal device, an uplink beam training mode of the target antenna set; and
   performing, by the terminal device, beam training based on the uplink beam training mode; wherein
   the determining, by the terminal device, the target antenna set in the plurality of supported antenna sets based on the first network signaling comprises:
      triggering, by the terminal device, a target reference signal (RS) resource set based on the first network signaling; and
      determining, by the terminal device, based on an association relationship between an RS resource set and an antenna set, the target antenna set corresponding to the target RS resource set; wherein
   the target RS resource set comprises a target sounding reference signal (SRS) resource set; and
   the determining, by the terminal device, the uplink beam training mode of the target antenna set comprises:
      determining, by the terminal device, whether first spatial relation information is configured for the target SRS resource set; and
      determining, by the terminal device, the uplink beam training mode based on a first result; wherein
   in a case that the first result is that the first spatial relation information is configured for the target SRS resource set, the determining, by the terminal device, the uplink beam training mode comprises:
      determining that information on all SRS resources in the target SRS resource set is transmitted by the terminal device on a target uplink transmit beam corresponding to a source RS, wherein the source RS corresponds to the first spatial relation information; or
      determining that through beam sweeping based on a first spatial range and the first spatial relation information, information on all SRS resources comprised in the target SRS resource set is transmitted by the terminal device; or
      determining, by the terminal device, the uplink beam training mode based on second network signaling; or
   in a case that the first result is that the first spatial relation information is not configured for the target SRS resource set, the determining, by the terminal device, the uplink beam training mode comprises:
      determining that through beam sweeping based on a third spatial range, information on all SRS resources comprised in the target SRS resource set is transmitted by the terminal device.

2. The method according to claim 1, wherein the determining, by the terminal device, based on an association relationship between an RS resource set and an antenna set, the target antenna set corresponding to the target RS resource set comprises:
   obtaining, by the terminal device, first configuration information, wherein the first configuration information is information configured by a network device for the target RS resource set based on capability parameter information of the terminal device; and
   determining, by the terminal device, the target antenna set based on the association relationship comprised in the first configuration information.

3. The method according to claim 2, wherein the capability parameter information of the terminal device comprises:
   information about a maximum quantity of antenna sets supported by the terminal device and information about a maximum quantity of supported beams in each antenna set.

4. A non-transitory computer-readable storage medium, wherein the non-transitory computer-readable storage medium stores a computer program, and when a processor executes the computer program, steps of the method according to claim 3 are implemented.

5. A non-transitory computer-readable storage medium, wherein the non-transitory computer-readable storage medium stores a computer program, and when a processor executes the computer program, steps of the method according to claim 2 are implemented.

6. The method according to claim 1, wherein the second network signaling comprises a preset spatial range parameter; and
   the determining, by the terminal device, the uplink beam training mode based on second network signaling comprises:
      in a case that the preset spatial range parameter is not set to a value or is set to 0, determining, by the terminal device, that the uplink beam training mode comprises: transmitting, by the terminal device, information on all SRS resources in the target SRS resource set on a target uplink transmit beam corresponding to a source RS, wherein the source RS corresponds to the first spatial relation information; or
      in a case that the preset spatial range parameter is not set to 0, determining, by the terminal device, the uplink beam training mode comprises: transmitting, by the terminal device, through beam sweeping based on the first spatial relation information and a spatial range corresponding to the preset spatial range parameter, information on all SRS resources comprised in the target SRS resource set; or
   the second network signaling comprises preset indication information indicating whether to perform beam sweeping; and
   the determining, by the terminal device, the uplink beam training mode based on second network signaling comprises:
      in a case that the preset indication information does not instruct to perform beam sweeping, determining, by the terminal device, the uplink beam training mode comprises: transmitting, by the terminal device, information on all SRS resources in the target SRS resource set on a target uplink transmit beam corresponding to a source RS, wherein the source RS corresponds to the first spatial relation information; or in a case that the preset indication information instructs to perform beam sweeping, determining, by the terminal device, the uplink beam training mode comprises: transmitting, by the terminal device, through beam sweeping based on a second spatial range and the first spatial relation information, information on all SRS resources comprised in the target SRS resource set.

7. A non-transitory computer-readable storage medium, wherein the non-transitory computer-readable storage medium stores a computer program, and when a processor executes the computer program, steps of the method according to claim 6 are implemented.

8. A non-transitory computer-readable storage medium, wherein the non-transitory computer-readable storage medium stores a computer program, and when a processor executes the computer program, steps of the method according to claim 1 are implemented.

9. A terminal device, comprising a memory, a processor, and a program that is stored in the memory and executable on the processor, wherein when the processor executes the program, the terminal device performs:
   determining a target antenna set in a plurality of supported antenna sets based on first network signaling;
   determining an uplink beam training mode of the target antenna set; and
   performing beam training based on the uplink beam training mode; wherein
   when the processor executes the program, the terminal device further performs:
      triggering a target reference signal (RS) resource set based on the first network signaling; and
      determining based on an association relationship between an RS resource set and an antenna set, the target antenna set corresponding to the target RS resource set; wherein
   the target RS resource set comprises a target sounding reference signal (SRS) resource set; wherein
   when the processor executes the program, the terminal device further performs:
      determining whether first spatial relation information is configured for the target SRS resource set; and
      determining the uplink beam training mode based on a first result; wherein
   in a case that the first result is that the first spatial relation information is configured for the target SRS resource set, when the processor executes the program, the terminal device further performs:
      determining that information on all SRS resources in the target SRS resource set is transmitted by the terminal device on a target uplink transmit beam corresponding to a source RS, wherein the source RS corresponds to the first spatial relation information; or
      determining that through beam sweeping based on a first spatial range and the first spatial relation information, information on all SRS resources comprised in the target SRS resource set is transmitted by the terminal device; or
      determining the uplink beam training mode based on second network signaling; or
   in a case that the first result is that the first spatial relation information is not configured for the target SRS resource set, when the processor executes the program, the terminal further device performs:
      determining that through beam sweeping based on a third spatial range, information on all SRS resources comprised in the target SRS resource set is transmitted by the terminal device.

10. The terminal device according to claim 9, wherein when the processor executes the program, the terminal device further performs:
   obtaining first configuration information, wherein the first configuration information is information configured by a network device for the target RS resource set based on capability parameter information of the terminal device; and
   determining the target antenna set based on the association relationship comprised in the first configuration information.

11. The terminal device according to claim 10, wherein the capability parameter information of the terminal device comprises:
   information about a maximum quantity of antenna sets supported by the terminal device and information about a maximum quantity of supported beams in each antenna set.

12. The terminal device according to claim 9, wherein the second network signaling comprises a preset spatial range parameter; and
   when the processor executes the program, the terminal device further performs:
      in a case that the preset spatial range parameter is not set to a value or is set to 0, determining, by the terminal device, that the uplink beam training mode comprises: transmitting, by the terminal device, information on all SRS resources in the target SRS resource set on a target uplink transmit beam corresponding to a source RS, wherein the source RS corresponds to the first spatial relation information; or
      in a case that the preset spatial range parameter is not set to 0, determining, by the terminal device, the uplink beam training mode comprises: transmitting, by the terminal device, through beam sweeping based on the first spatial relation information and a spatial range corresponding to the preset spatial range parameter, information on all SRS resources comprised in the target SRS resource set; or
   the second network signaling comprises preset indication information indicating whether to perform beam sweeping; and
   when the processor executes the program, the terminal device performs:
      in a case that the preset indication information does not instruct to perform beam sweeping, determining, by the terminal device, the uplink beam training mode comprises: transmitting, by the terminal device, information on all SRS resources in the target SRS resource set on a target uplink transmit beam corresponding to a source RS, wherein the source RS corresponds to the first spatial relation information; or
      in a case that the preset indication information instructs to perform beam sweeping, determining, by the terminal device, the uplink beam training mode comprises: transmitting, by the terminal device, through beam sweeping based on a second spatial range and the first spatial relation information, information on all SRS resources comprised in the target SRS resource set.

13. A network side device, comprising: a memory, a processor, and a program that is stored in the memory and executable on the processor, wherein when the processor executes the program, the network side device performs:
- generating first network signaling; and
- transmitting the first network signaling, wherein the first network signaling is used to indicate a target antenna set in a plurality of antenna sets supported by a terminal device; wherein
- the first network signaling is used to trigger a target reference signal (RS) resource set, and the target RS resource set is used to indicate the target antenna set; wherein
- the target RS resource set comprises a target sounding reference signal (SRS) resource set; and
- determining a first result, wherein the first result comprises that first spatial relation information is configured for the target SRS resource set or first spatial relation information is not configured for the target SRS resource set, and the first result is used by the terminal device to determine an uplink beam training mode of the target antenna set; wherein
- in a case that the first result is that the first spatial relation information is configured for the target SRS resource set, when the processor executes the program, the network side device further performs:
  - generating second network signaling; and
  - transmitting the second network signaling, wherein the second network signaling is used to indicate the uplink beam training mode.

14. The network side device according to claim 13, wherein when the processor executes the program, the network side device further performs:
- determining an association relationship between an RS resource set and an antenna set based on capability parameter information of the terminal device;
- placing the association relationship in first configuration information corresponding to the target RS resource set; and
- transmitting the first configuration information to enable the terminal device to determine the target antenna set based on the target RS resource set and the association relationship.

15. The network side device according to claim 13, wherein the second network signaling comprises one of following:
- a preset spatial range parameter indicating the uplink beam training mode based on a setting situation of the preset spatial range parameter; and
- preset indication information, wherein the preset indication information is used to indicate whether to perform beam sweeping and is used by the terminal device to determine the uplink beam training mode.

* * * * *